United States Patent [19]
Reime

[11] Patent Number: 5,900,960
[45] Date of Patent: May 4, 1999

[54] CIRCUIT ARRANGEMENT FOR RECEIVING LIGHT SIGNALS

[75] Inventor: Gerd Reime, Schömberg, Germany

[73] Assignee: ITT Automotive Europe GmbH, Germany

[21] Appl. No.: 08/687,561

[22] PCT Filed: Feb. 7, 1995

[86] PCT No.: PCT/DE95/00150

§ 371 Date: Oct. 16, 1996

§ 102(e) Date: Oct. 16, 1996

[87] PCT Pub. No.: WO95/21371

PCT Pub. Date: Aug. 10, 1995

[30] Foreign Application Priority Data

Feb. 7, 1994 [DE] Germany ............................ 44 03 982

[51] Int. Cl.$^6$ .................................................. H04B 10/06
[52] U.S. Cl. .......................................... 359/189; 359/194
[58] Field of Search .................................... 359/189, 190, 359/191, 193, 194, 195, 152; 250/214 LA, 214 LS, 214 AG, 214 AL, 214 B, 214 DC

[56] References Cited

U.S. PATENT DOCUMENTS

| 4,805,237 | 2/1989 | Donald et al. |
| 5,359,446 | 10/1994 | Johnson et al. ........................ 359/152 |

FOREIGN PATENT DOCUMENTS

| 2 674 080 | 9/1992 | France . |
| 1 562 059 | 2/1970 | Germany . |
| 2 002 013 | 7/1971 | Germany . |
| 2 301 945 | 5/1974 | Germany . |
| 3 218 439 | 12/1983 | Germany . |
| 3 244 712 | 6/1984 | Germany . |
| 3 620 931 | 1/1988 | Germany . |
| 3 627 972 | 2/1988 | Germany . |
| 3 818 168 | 4/1990 | Germany . |
| 9 309 837 | 10/1993 | Germany . |
| 57-133 325 | 8/1982 | Japan . |
| 61-202 124 | 9/1986 | Japan . |
| 63-250 928 | 10/1988 | Japan . |
| 2-087 709 | 3/1990 | Japan . |
| 1 771 074 | 10/1992 | Russian Federation . |
| WO95/01561 | 1/1995 | WIPO . |

OTHER PUBLICATIONS

"Linear Circuits Data Book 1992," vol. 1, Operational Amplifiers, Texas Instruments, Figure 47.

Schmith, R.G. et al.: Optical Detector Package, *The Bell System Technical Journal*, vol. 57, No. 6, Jul./Aug., 1978, pp. 1809–1822.

Schmidt, Wolfgang; Feustel, Ortwin: *Optoelektronik kurz und bündig*, Vogel–Verlag, 1975, pp. 53–60, 71–74.

*Primary Examiner*—Rafael Bacares
*Attorney, Agent, or Firm*—Ratner & Prestia

[57] ABSTRACT

A circuit arrangement for a light signal receiver for receiving and recognizing light signals which are transmitted in a pulsed manner and to which ambient light of an undefinable intensity is parasitically superimposed. The circuit arrangement contains a two-pole light sensor and, for each terminal pole of the light sensor, a separate current-voltage converter for direct current is provided. The current-voltage converters have identical transmission behavior. Each terminal pole of the light sensor is connected to an identical signal input of a current-voltage converter. The current-voltage converters are connected as amplifying filters and are negative feedback-connected in terms of direct current and in a frequency-dependent manner so strongly via the input at which the terminal pole of the light sensor is located that the d.c. voltage at the terminal poles of the light sensor is constant independently from the intensity of the parasitic light. The outputs of the current-voltage converters are connected in terms of alternating current to an input of a differential amplifier.

14 Claims, 2 Drawing Sheets

CIRCUIT ARRANGEMENT FOR RECEIVING LIGHT SIGNALS

This application is the U.S. national-phase application of PCT International Application No. PCT/DP95/00150.

BACKGROUND OF THE INVENTION

The present invention pertains to a circuit arrangement for receiving light signals, which are emitted over an open optical path, i.e., in ambient light. The circuit is used to receive light signals which are sent by evaluating the intensity for recognizing changes occurring over a limited time in the structure of a medium which is located in the transmission path. Changes of this kind may be caused by, for example, water drops located in the air of the optical transmission path or on a glass pane which is arranged in the transmission path.

An arrangement for measuring or recognizing the wetting of a wall or plate transparent to a certain radiation was proposed in German Utility Model No. G 93 09 837.5. This arrangement can be used, for example, to detect water drops located as precipitate on the windshield of a motor vehicle.

This device uses an optical arrangement with two light-emitting diodes, between which a light sensor is located, and which are arranged behind the windshield of a motor vehicle. The light-emitting diodes emit push-pull-pulsed light. The light sensor receives part of the light of the light-emitting diodes reflected from the windshield. The windshield reflects the rays emitted in the push-pull mode approximately equally in the dry state, so that the received light from the two light-emitting diodes acts like constant light in the circuit arrangement. The reflection condition, and consequently the signal ratio, change irregularly at short time intervals upon the impact of rain drops. The received light component of one light-emitting diode predominates, and an alternating current is generated in the light sensor in the cycle of the pulse frequency of the light that is emitted by the light-emitting diodes. These changes are evaluated.

Such a device, which is operated in an optically unshielded space, has the problem that intensely varying, undefinable ambient light is present, and this light continuously reaches the light sensor as an interfering light. This light is usually constant light, for example, the light of the sun or of incandescent lamps. However, it may additionally also be received as chopped light, such as the light of gas discharge lamps or a constant light influenced by the travel motion of the motor vehicle. The intensity of the ambient light may change in rapid succession in an undefinable manner during the travel of the motor vehicle, so that no reliable information can be obtained from this light on the nature of the transmission path, for example, the presence of rain drops. If the light sensor is equipped with optical filtering means, this parasitic light is then received at varying intensity and is converted into a corresponding electrical signal component. The converted electrical signal, therefore, always consists of an equisignal component, whose value may vary within a broad range, and a superimposed alternating signal component, which represents the evaluable wanted signal. The level of the equisignal component may be a multiple of the amplitude of the wanted signal. At high intensity, parasitic light may overmodulate the light sensor and/or the receiving amplifier. In this case, the wanted signal cannot be sufficiently separated from the equisignal component and evaluated. Measures are therefore necessary to eliminate the parasitic light.

To support these measures, the light is scanned at a frequency of about 40 kHz. Only insignificant parasitic light components are present in this frequency range.

A light receiver comprises, in general, a light sensor, an amplifier, means for suppressing the effects of parasitic light, and a demodulator for recovering the signal from the converter photocurrent. This signal is evaluated by a synchronous demodulator, and it generates a signal which corresponds, for example, to the frequency of defects in the optical transmission path. Photodiodes are usually used as light sensors.

Such a circuit arrangement has been known from the book "Linear Circuits Data Book 1992," Volume 1, Operational Amplifiers of the Firm of Texas Instruments Incorporated, U.S.A., on page 2–722, FIG. 47. This circuit arrangement is shown in FIG. 1 of the present application for better understanding, and it contains two linear operational amplifiers (precision double operational amplifiers in the CMOS technique of the type TLC 27 M 2 may be used).

The cathode of a photodiode is connected to the inverting input of a first operational amplifier, and the anode is connected to the ground of the circuit. This first operational amplifier is negative feedback-connected only weakly via a first loop, which contains a high-ohm resistor (10 Mohm for example) and has a high current-voltage factor during the transmission of the photocurrent in order to generate a sufficient amplitude of the wanted electric signal even at a low brightness amplitude, which, compared with the parasitic light, the modulated signal light has.

The noninverting input of the first operational amplifier is connected to a reference voltage, whose value may be between zero and the operating voltage of the circuit minus 2 V. Regardless of the intensity of the received light, the operating point of the photodiode is placed with this reference voltage into the stop band. This band guarantees a sufficient overmodulation resistance for the amplitude of the modulated signal light.

Via a second loop, which contains a second operational amplifier connected to a low-pass filter as a noninverting d.c. voltage amplifier, the output signal of the first operational amplifier, which must be fed to a corresponding circuit for evaluation, is additionally negative feedback-connected, by d.c. voltage, substantially more strongly than via the first loop. This negative feedback brings about a compensation of the photocurrent that is generated by the parasitic light in the photodiode.

When light arrives, the blocking resistance of the photodiode decreases in a manner corresponding to the brightness. The change in the photocurrent flowing over the negative feedback into the photodiode brings about an increase in the output voltage in the first operational amplifier. Due to its integrator function, the low-pass filter ensures that only the d.c. voltage component of the output voltage generated by the first operational amplifier is fed back negatively to the cathode of the photodiode via the second loop.

Thus, only the part of the signal current that is generated by the photodiode and whose frequency is above the limit frequency of the low-pass filter is transmitted to the output of the circuit with a high current-voltage factor. The effect of the parasitic light is very extensively suppressed.

However, one drawback of this arrangement is the high ohmic, negative feedback of the first operational amplifier, which is necessary for obtaining a high current-voltage factor in order to convert the small percentage of reflected light of the wanted signal into a sufficiently high signal voltage. At an unfavorable ratio of parasitic light to signal light, which may occur in this case, a high operating voltage is necessary for a sufficient equisignal suppression and overmodulation resistance of the circuit, and such a high operating voltage may be above the voltage available in a motor vehicle. Due to these requirements, this prior-art circuit is not ideally suited for its intended purpose because of the excessively high operating voltage needed, an insufficient transmission frequency, and a high interference susceptibility, which are the consequences of the high ohmic circuitry.

At an unfavorable ratio of signal light to parasitic light, the photodiode of the prior art device must be operated with a bias voltage, at which the photodiode operates in the blocking state. Only a very low signal alternating current is generated in this operating range. The downstream amplifier, therefore, must have a high signal sensitivity in order to convert the very weak signal current into an evaluable signal voltage.

Another problem with the prior art device is the geometric arrangement of the photodiode, the signal line, and the receiving amplifier. Since the photodiode has a high internal resistance in the blocking state, which may reach several hundred kOhm, many parts of the circuit are especially sensitive to the coupling of interference signals, for example, interferences generated by the ignition system of motor vehicles, power line hum, switching impulses, and, in a special case, to the coupled signal from the light-emitting diodes and other interferences which may reach the circuit inductively and/or capacitively due to leakage fields. Electromagnetic shielding and compact design of the photodiode and of the amplifier are therefore necessary, and this may even make it necessary to arrange the light inlet opening at the photodiode behind a shield made of a fine wire-mesh screen. Such a compact and shielded design is expensive and is highly disadvantageous from the viewpoint of design and layout (at the windshield of a motor vehicle).

SUMMARY OF THE INVENTION

The present invention is directed to a circuit for a light receiver
which selects and exactly demodulates signals with a relatively high pulse frequency (e.g., 40 kHz) without expensive filtering means,
which is insensitive to a high ratio of parasitic light intensity to signal light intensity, and
which is characterized by a very high resistance to the effects of electromagnetic interference fields.

The circuit can operate in a trouble-free manner in motor vehicles, in which intense electromagnetic fields, continuously changing ambient light, great variations in temperature, and strong disturbances in voltage have been known to occur.

In one embodiment-of the present invention, a separate, identical d.c. voltage amplifier is provided as a current-voltage converter for each terminal pole of a light sensor (e.g. a photodiode). The terminal poles are connected to an identical input, which is preferably the inverting input of the current-voltage converter associated with them. The terminal poles are negative feedback-connected in a frequency-dependent manner via identical d.c. paths. The d.c. paths are connected to the terminal poles of the light sensor, so that the negative feedback-connected direct current flows through the light sensor. The d.c. negative feedback is set so that the direct voltage over the terminal poles of the light sensor is substantially constant regardless of the value of the constant light, and the photocurrent generated by this light is transmitted with a low current-voltage factor.

The current-voltage converter is preferably wired by means of a symmetrical filter such that pulsating photocurrent, which is pulsed at a frequency in the range of the frequency of the signal light, is transmitted with a substantially higher current-voltage factor to the outputs than is the photocurrent of the constant light, which is composed in this case of a parasitic, low-frequency and/or uniform light and the light emitted alternatingly, in the dry state in equal portions, by the two light-emitting diodes. A symmetrical filter provides equal current-voltage ratios even in the range of the pulse frequency of the signal light in the current-voltage converters. The outputs of the current-voltage converters, between which the transmitted photocurrent is present in the form of a voltage pulsating in antiphase, are connected for alternating current to an input of a differential amplifier. The differential amplifier performs the common mode suppression and, thus, suppresses all common mode interferences (such as the undefinable component of the constant light) and electromagnetically received interfering signals and, preferably, amplifies the pulse voltage.

The circuit has the advantage that regardless of the value of the constant light, the light sensor can be operated with a working point in the vicinity of the zero point with high overmodulation resistance and high common mode suppression.

In this range, photodiodes possess favorable properties as signal converters, such as medium impedance values, high light sensitivity, and high speed of transmission. Furthermore, the circuit is highly insensitive to the effects of electrical and magnetic interference fields because the signal flow is not related to ground. Shielding measures and very compact design are, therefore, unnecessary. For design or layout reasons, the sensor may be operated offset from the current-voltage converters, and the electrical connections from the sensor to the input of the current-voltage converters and the connections from the light emitter output to the transmitting diodes may be arranged in a common, four-conductor, simple-shielded cable.

The present invention will be described in greater detail below on the basis of an exemplary embodiment. However, the present invention is not limited to this exemplary embodiment. Other embodiments are possible.

DETAILED DESCRIPTION OF THE INVENTION

Figure 1:
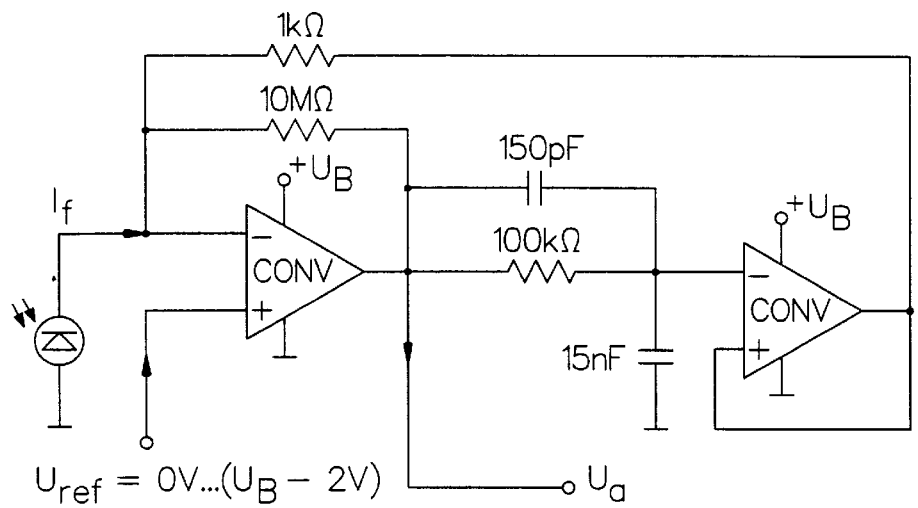
FIG. 1 shows a prior-art circuit arrangement.
Figure 2:
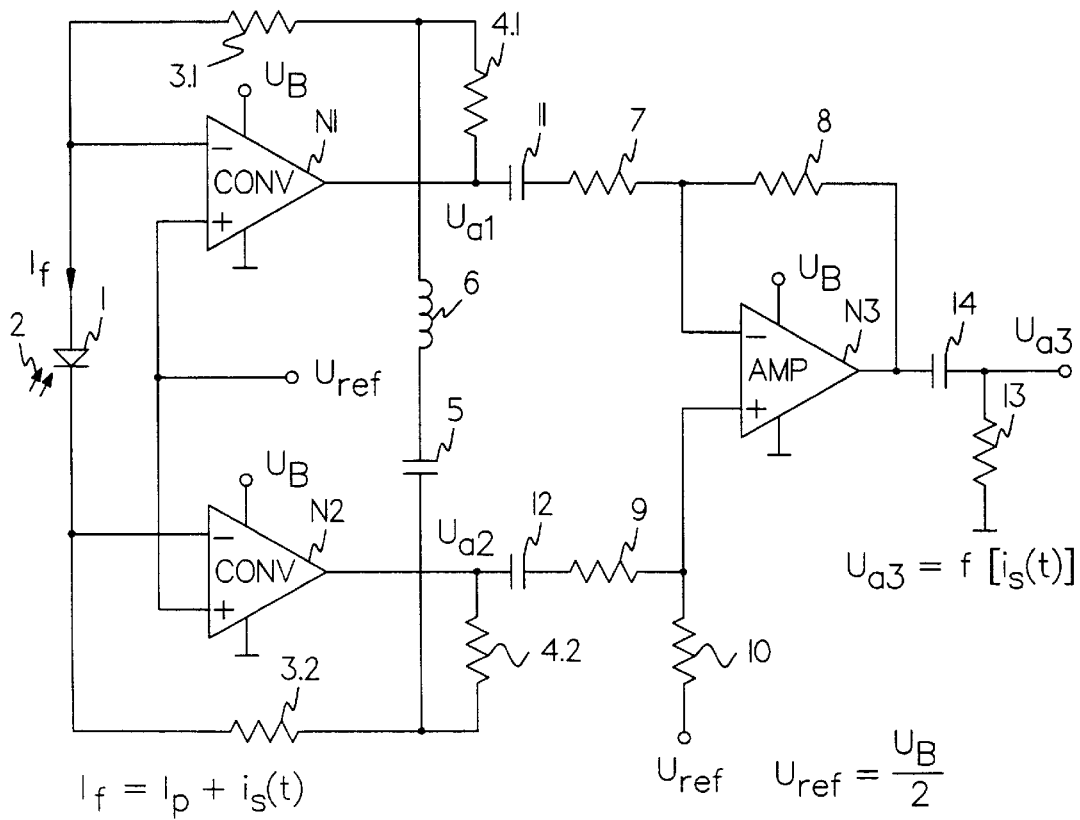
FIG. 2 shows a circuit arrangement according to the basic principle of the present invention.

FIG. 2 schematically shows one embodiment of the present invention for receiving and recognizing pulsed light. A first pole of a photodiode 1 for receiving light signals 2 is connected to the inverting input of a first current-voltage converter N1, and the other pole of the photodiode 1 is connected to the inverting input of a second current-voltage converter N2. The current-voltage converters N1 and N2 are operational amplifiers, which are identically negative feedback-connected via their inverting inputs by means of a d.c. path, which contains resistors 3.1 and 4.1 and resistors 3.2 and 4.2.

The d.c. paths are connected to a series connection of a filter capacitor 5 and an inductance 6 to form a symmetrical filter with the resistors 3.1, 3.2, 4.1, and 4.2 for blocking the frequency f0 of the wanted signal $U_{a0}$ in the negative feedback branches. The current-voltage converters N1 and N2, thus, transmit the signal alternating current $i_s$–f(f0) of the photodiode with a substantially higher current-voltage factor than the direct current $I_p$ that is generated by the constant light.

A differential amplifier N3, which may also be an operational amplifier, is wired to the resistors 7 through 10 and is connected to the outputs of the current-voltage converters N1 and N2 via capacitors 11 and 12.

The noninverting inputs of the current-voltage converters N1 and N2 are advantageously connected to a common reference d.c. voltage $U_{ref}$, so that the photodiode 1 is operated without bias voltage as a photocell and generates a photocurrent $I_f$ in the presence of light.

The circuit according to the presently described embodiment operates as follows:

The entire incident light generates a photocurrent $I_f=I_p+i_s(t)$ in the photodiode 1. This means that the photocurrent If consists of a d.c. component $I_p$, which generates the constant light, and an a.c. component $i_s(t)$, which is superimposed on the d.c. component $I_p$. The light is emitted at a pulse frequency f0=40 kHz.

Figure 3:
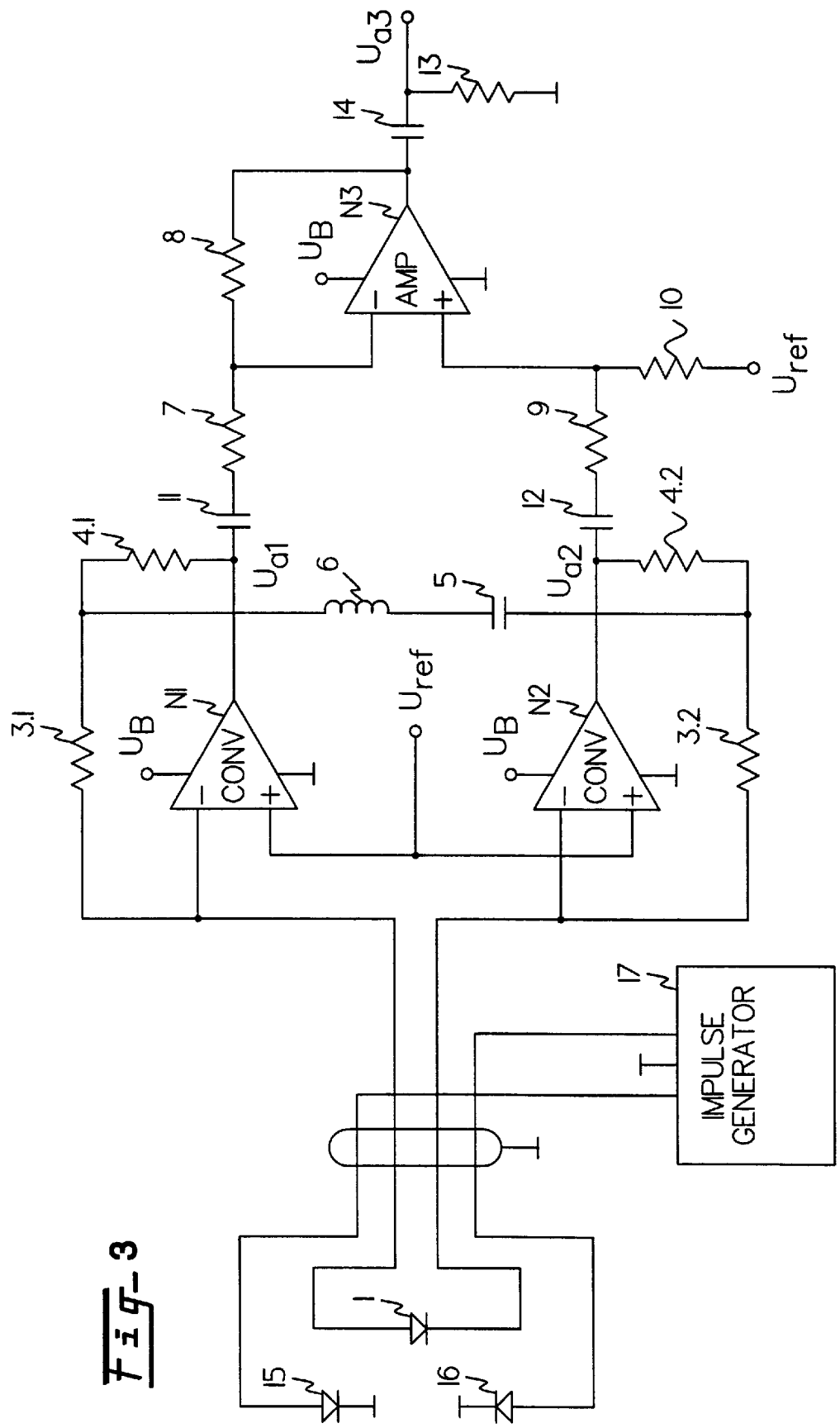
FIG. 3 shows an embodiment of the present invention, in which the light-emitting diodes and the sensor are operated offset from the rest of the electronic system.

Since the light emitted by the light-emitting diodes 15 and 16 of FIG. 3 generates a constant photocurrent If in the photodiode when a homogeneous structure is located in the-transmission path, this light is part of the d.c. component $I_p$. In this case, the a.c. component of the photocurrent is $i_s(t)=0$. However, an a.c. component $i_s(t)>0$ is generated due to the different reflection conditions of the pulsating light only in the case of an inhomogeneous structure, such as a raindrop on a windshield.

In the present embodiment, the photocurrent If flows from the output of the first current-voltage converter N1 via the resistors 3.1 and 4.1, the photodiode 1, and the resistors 3.2 and 4.2 to the output of the second current-voltage converter N2. Because the current-voltage converters N1 and N2 are wired identically in this exemplary embodiment, the association of the terminal poles with the current-voltage converters N1 and N2 may be selected as desired. The d.c. negative feedback of the current-voltage converters N1 and N2 causes the voltage over the photodiode to remain in the vicinity of zero regardless of the value of the d.c. component $I_p$. This means that the d.c. voltages $U_{a1}=U_{ref}-U_p-u_s(t)$ and
$U_{a2}=U_{ref}+U_p+u_s(t)$, which counteract the photocurrent, become established at the outputs of the current-voltage converters N1 and N2 as a consequence of the d.c. component $I_p$.

The resistors 3.1 through 4.2 are dimensioned such that the current-voltage converters N1 and N2 do not reach saturation, even in the case of a very strong d.c. component $I_p$ and a weak operating voltage $U_B$. The arrangement of the filter capacitor 5 and of the inductance 6 between the d.c. paths increases the current-voltage factor for the pulsating signal current $i_s(t)$. The output voltages $U_{a1}$ and $U_{a2}$ already have a substantially better ratio of the wanted signal to the quisignal than the photocurrent $I_f$.

The signal $U_{a3}$ behind the capacitor 14 at the output of the differential amplifier N3 is completely free from low-frequency and d.c. components and can be used for evaluation by a synchronous demodulator. The circuit arrangement can be designed such that the above-described object is accomplished with, for example, the operating voltage of the motor vehicle.

Advantages of the circuit include the high suppression of constant light, good overmodulation resistance even at low operating voltage, and very high resistance to interference with respect to ambient electromagnetic signals at a very high wanted signal sensitivity, so that measures for shielding are not necessary.

FIG. 3 shows an alternative embodiment of the present invention as a rain sensor. The photodiode 1 is arranged offset from the receiver circuit in this embodiment. The light-emitting diodes 15 and 16 are arranged on the windshield of a motor vehicle together with the photodiode 1. The light-emitting diodes 15 and 16 are alternatingly supplied with power from a push-pull impulse generator 17.

The signal lines to the photodiode 1 and to the light-emitting diodes 15 and 16 can be arranged, as is shown, in a four-conductor, simple-shielded cable if the two lines leading to the photodiode 1 are arranged in the cable diagonally to the respective feed line of the light-emitting diodes 15 and 16.

I claim:

1. A circuit arrangement for receiving and demodulating pulsed light signals, to which ambient light of an undefinable intensity is superimposed in a parasitic manner, with a two-pole light sensor, which is connected to means for amplifying equisignals, which means are negative feedback-connected in a frequency-dependent manner, wherein a negative feedback current flows through the light sensor, and the circuit has a high negative feedback factor for the signal component generated by the ambient light and thus compensates this signal component, characterized in that a current-voltage converter for direct current is present for each terminal pole of the light sensor, whereby each terminal pole is connected with an identical signal input from a current-voltage converter that the current-voltage converters have an identical transmission behavior, are wired as amplifying filters for the light signals, and are fed back negatively so strongly in terms of direct current and as a function of the frequency via the input at which the terminal pole of the light sensor is located that the d.c. voltage over the terminal pole of the light sensor is constant regardless of the intensity of the parasitic light, and that the outputs of the current-voltage converters are connected in terms of alternating current to a respective input of a differential amplifier.

2. A circuit arrangement in accordance with claim 1, characterized in that the light sensor is a photodiode without bias voltage.

3. A circuit arrangement in accordance with claim 1, characterized in that the identical signal inputs of the current-voltage converters are inverting inputs.

4. A circuit arrangement in accordance with claim 1, characterized in that the current-voltage converters and the differential amplifier are linear operational amplifiers.

5. A circuit arrangement in accordance with claim 1, characterized in that the frequency-dependent negative feedback for both current-voltage converters is a symmetrical filter.

6. A circuit arrangement in accordance with claim 1, characterized in that the current-voltage converters and the differential amplifier are linear operational amplifiers, which are contained on one circuit chip.

7. A circuit arrangement for receiving pulsed light signals superimposed on ambient light signals, said circuit arrangement comprising:

means for emitting pulsed light signals;

a light sensor having two terminal poles for:
 (a) receiving the pulsed light signals and ambient light signals, and
 (b) producing electrical signals having an alternating signal component representative of the pulsed light signal and an equisignal component representative of the ambient light signal;
means for amplifying the electrical signals; and
negative feedback means for conducting identical levels of the equisignal component to both terminal poles of said light sensor.

8. A circuit arrangement as claimed in claim 7, wherein said negative feedback means include a symmetrical filter for blocking the alternating signal component from being conducted from said amplifying means to said light sensor.

9. A circuit arrangement as claimed in claim 8, wherein said amplifying means comprise two identical current-voltage converters individually connected to a terminal pole of said light sensor.

10. A circuit arrangement as claimed in claim 9, wherein each of said terminal poles is individually connected to an inverting input of said current-voltage converters.

11. A circuit arrangement as claimed in claim 10, wherein said current-voltage converters are linear operational amplifiers.

12. A circuit arrangement as claimed in claim 7, wherein said circuit arrangement further comprises a differential amplifier to receive the amplified outputs of said amplifying means and suppress any common mode signals in said output.

13. A circuit arrangement as claimed in claim 12, wherein said differential amplifier is a linear operational amplifier.

14. A circuit arrangement as claimed in claim 13, wherein said light sensor is a photodiode.

* * * * *